United States Patent [19]

Bustos

[11] 4,293,062

[45] Oct. 6, 1981

[54] CONVEYOR BELT ASSEMBLY FOR A DISPLAY RACK

[75] Inventor: Rafael T. Bustos, Clarkston, Ga.

[73] Assignee: Leggett & Platt, Inc., Carthage, Mo.

[21] Appl. No.: 13,246

[22] Filed: Feb. 21, 1979

[51] Int. Cl.$^3$ ............................................... A47F 5/00
[52] U.S. Cl. ................................. 193/2 D; 211/49 D
[58] Field of Search .............. 198/860, 861; 193/2 R, 193/2 D, 35 C, 35 R, 35 TE, 38; 308/18, 20, 15, 22, 35, 36, 238; 211/49 R, 49 D, 121, 122; 226/194; 312/45, 91; 221/124, 125, 129, 242

[56] References Cited

U.S. PATENT DOCUMENTS 2,613,789 10/1952 McLaughlin .................. 193/35 TE
4,128,177 12/1978 Bustos .......................... 193/2 D X

*Primary Examiner*—Robert B. Reeves
*Assistant Examiner*—Gene A. Church

*Attorney, Agent, or Firm*—Wood, Herron & Evans

[57] ABSTRACT

An improved conveyor belt assembly that gravity feeds a column of containers one after another to the front edge of a display rack's shelf as that column's lead containers are successively removed by customers, the conveyor belt having certain specific friction coefficient relationships relative to its support floor and the containers thereon. The improved conveyor belt assembly includes a support floor, a snap-on end cap attached to each end of the support floor, and an endless conveyor belt that tracks over an idler spool mounted on each end cap. A shock absorber against which the column's lead container abuts during use is mounted on the front one of the end caps. The end caps also include alignment structure which cooperates with display rack's shelf to restrain the assembly in desired orientation on the shelf.

11 Claims, 7 Drawing Figures

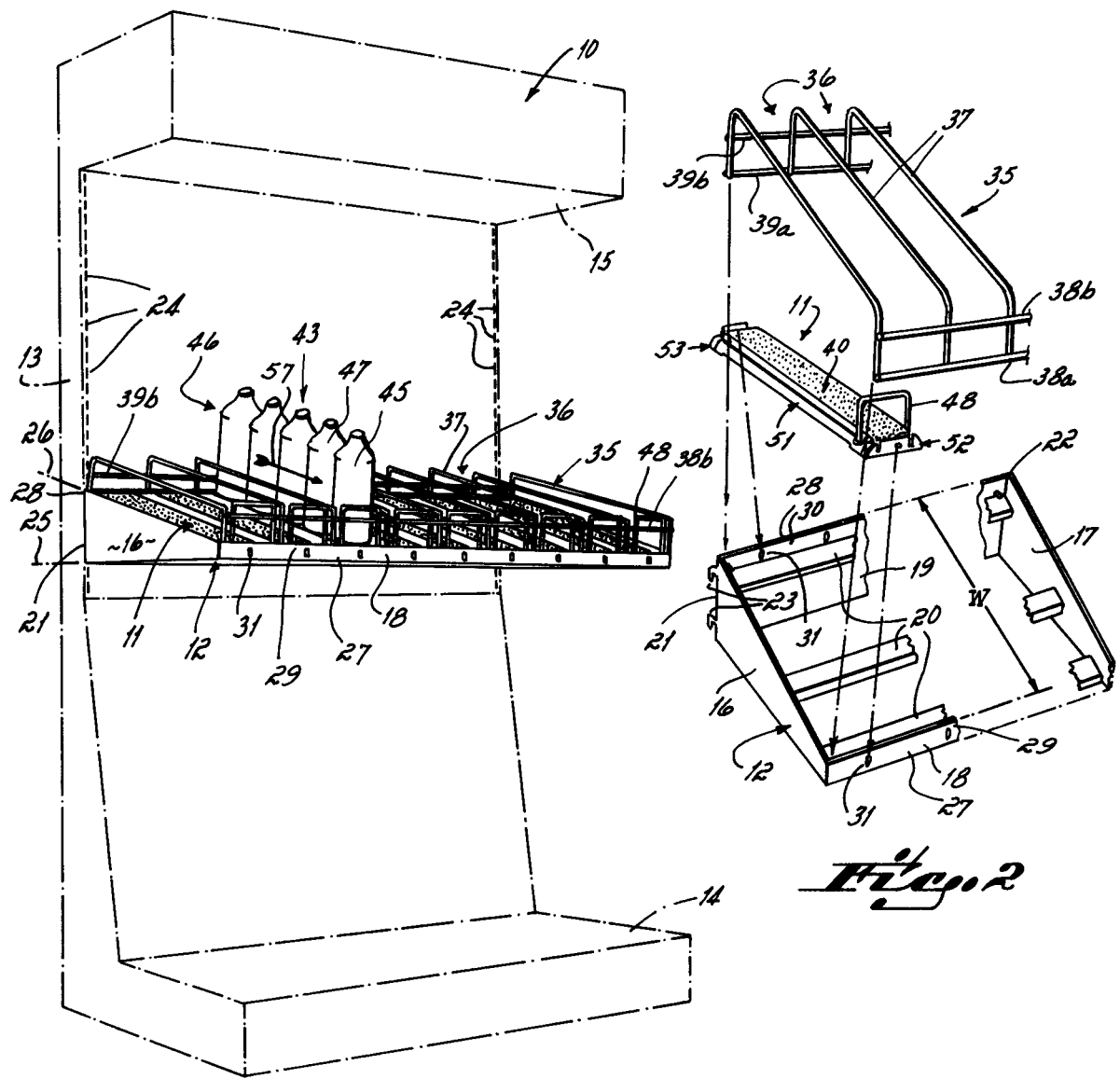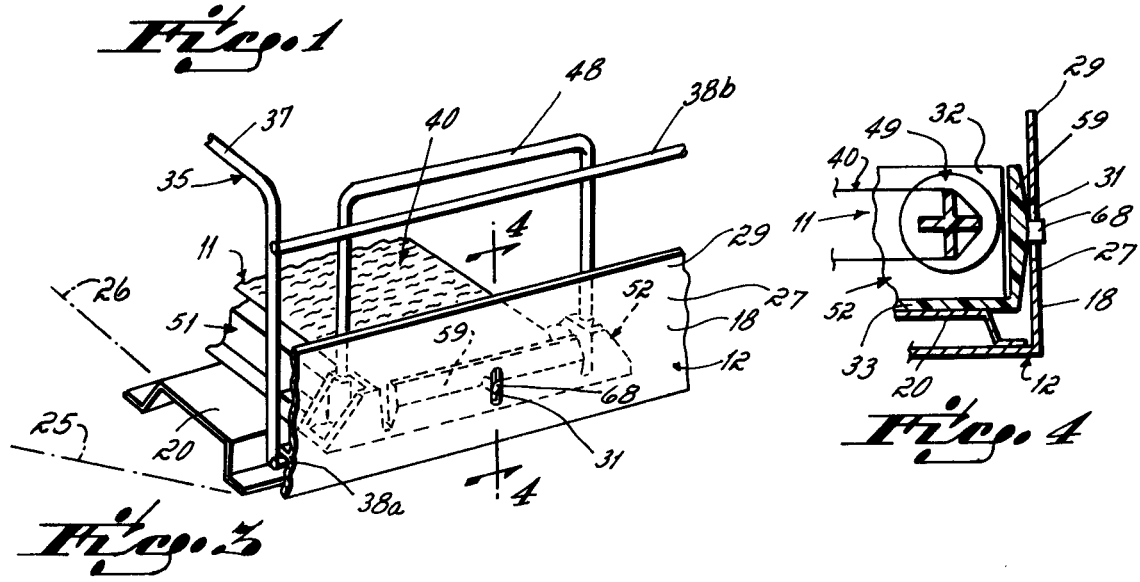

CONVEYOR BELT ASSEMBLY FOR A DISPLAY RACK

This invention relates to display racks. More particularly, this invention relates to an improved display rack of the gravity feed type.

Display racks are often used in supermarkets, as well as in other types of stores, to display items of merchandise generally handled as self-service items. For example, display racks are often used in supermarkets to display cans or bottles of soft drinks, the cans or bottles being removable for purchase by the customer in a self-service manner from the display rack.

Historically, display racks originally were comprised of a plurality of planar horizontal shelves held in spaced relation by vertical cornerposts, the packages or containers thereon, e.g., cans or bottles of soft drinks, being arranged on each shelf in adjacent rows parallel to the shelf's front edge from the shelf's front edge to the shelf's rear edge. In this type of prior art display rack structure, the prospective customers first remove the containers at the front edge of the shelf, i.e., in the front row, then remove the containers in the second row, then from the third row, and so forth until the shelf is emptied. However, access to the containers on a shelf in the rear rows, and across the width of the rack, is impeded if the shelf is of significant depth or if another shelf is above that shelf. This makes it difficult for customers to reach the merchandise in the first instance and, perhaps as importantly, tends to hide the merchandise from display in the second instance if a partially filled shelf has another shelf disposed above it. Thus, it is highly desirable to provide a shelf structure for a display rack in which the front row of the shelf is always filled with containers for two reasons. The first reason is so that all the containers displayed on the shelf will be presented at an easily accessible position to the retail customer. The second reason is so that, after the front rows of containers have been removed from the shelf, the remaining product displayed on the shelf is still visually displayed in full to the customer at the rack's front face, and is not partially hidden by virtue of being disposed, e.g., in a rear area of the shelf.

A couple of different types of display rack structures have been developed over the years which tend to solve the merchandising problems present in the historical display rack structure as discussed above. These types of display rack structures incorporate the concept of slanted or sloped shelves on which the merchandise is stored or displayed. When the front product in a given column on a shelf is removed, gravity causes the products behind that front product to move forwardly in the column until stopped at the front edge of the shelf. One typical type of gravity feed shelf assembly for a display rack is illustrated in Pendergrast, Jr., et al U.S. Pat. No. 3,203,553 and Shield U.S. Pat. No. 2,443,871. These two patents disclose gravity feed can racks in which the cans are disposed horizontal so that the rear cans in a shelf column can roll down the sloped shelf in response to removal of the lead can in that column. Another type of gravity feed shelf assembly is illustrated in Bergstedt U.S. Pat. No. 3,279,618. In the Bergstedt patent, vertically disposed cans slide down a sloped shelf structure to the front edge thereof. Another type rack structure, as used for a storage rack, is illustrated in Azzi et al U.S. Pat. No. 3,900,112. The Azzi et al rack structure incorporates skate wheels in a sloped shelf structure so as to promote movement of the articles from the rear of the shelf to the front of the shelf when the article at the front of the shelf has been removed.

In each of these prior art shelf assemblies, however, a significant problem arises particularly if the containers displayed thereon are of a frangible nature, e.g., glass bottles. In each of the prior art structural concepts, the remaining containers in any one shelf column impact against the new lead container in that column, and against one another, as the column moves forwardly due to gravity after removal of the old lead container in that column. In other words, and in the case of containers within a column in a gravity feed shelf structure of those types known to the prior art, the containers tend to move individually or independent one of another and, therefore, the containers tend to impact or hit one another in backlash fashion as they come to a stop against a new lead container, and against one another, upon moving forward due to gravity. This may create a problem of some significance for certain types of containers on a display rack in that it can result in broken or chipped bottles or dented cans, in the case of those types of containers. Also, this problem can result in disfigured or marked up artwork on the containers in the case of cans or bottles.

In response to this problem, there has been recently invented a novel display rack incorporating an improved shelf assembly of the gravity feed type, that shelf assembly including a column feed unit that carries a column of upright containers on a belt, the belt being movable in response to gravity so as to move the entire column of containers forwardly together after removal of the lead container in the column. The conveyor belt is supported by a sloping support floor on the underside of its container run. The upper surface of the conveyor belt has a friction relation with the containers that inhibits movement on the belt of the containers relative one to the other. The support floor and the under surface of the conveyor belt has a friction relation with one another that allows movement of the belt over the support floor when the belt is at least partially loaded with containers and when not restrained against movement. These friction relationships are such that the belt can slide over the support floor while the containers remain generally stationary relative one to the other on the conveyor belt after removal of a column's lead container during use of the rack. This novel display rack is illustrated and described in detail in U.S. Pat. No. 4,128,177, issued Dec. 5, 1978, and assigned to the assignee of this application.

It has been the primary objective of this invention to provide an improved conveyor belt assembly for a display rack of the type described in U.S. Pat. No. 4,128,177, issued Dec. 5, 1978.

In accord with this objective, the improved conveyor belt assembly of this invention gravity feeds a column of containers one after another to the front edge of a display rack's shelf as that column's lead containers are successively removed by customers. In preferred form, the improved conveyor belt assembly includes a support floor, a snap-on end cap attached to each end of the support floor, and an endless conveyor belt that tracks over an idler spool mounted on each end cap. A shock absorber against which the lead container abuts during use is mounted on the front one of the end caps. The end caps also include alignment structure which cooperates with the display rack's shelf to restrain the assembly in desired orientation on the shelf. The friction coefficient relationship between the conveyor belt and its support floor, relative to the friction coefficient relationship between the conveyor belt and containers supported thereon, is such that the containers on the belt do not move significantly relative to the belt as the belt moves or as it stops, and is such that when the lead container on the assembly is removed from the front edge of the shelf, gravity on the remaining containers on the belt causes the belt to slide forwardly over the stationary support floor, until the next forward container abuts the bumper at the shelf's front edge.

Other objectives and advantages of this invention will be more apparent from the following detailed description taken in conjunction with the drawings in which:

FIG. 1 is a perspective view illustrating a plurality of improved conveyor belt assemblies located in use position on a display rack;

FIG. 2 is an exploded perspective view, partially broken away, illustrating a shelf for the display rack, and assembly therewith of one of the improved conveyor belt assemblies shown in FIG. 1;

FIG. 3 is an enlarged partial perspective view of the front end of an improved conveyor belt assembly in position on the shelf;

FIG. 4 is a cross-sectional view taken along line 4—4 of FIG. 3;

Figure 5:
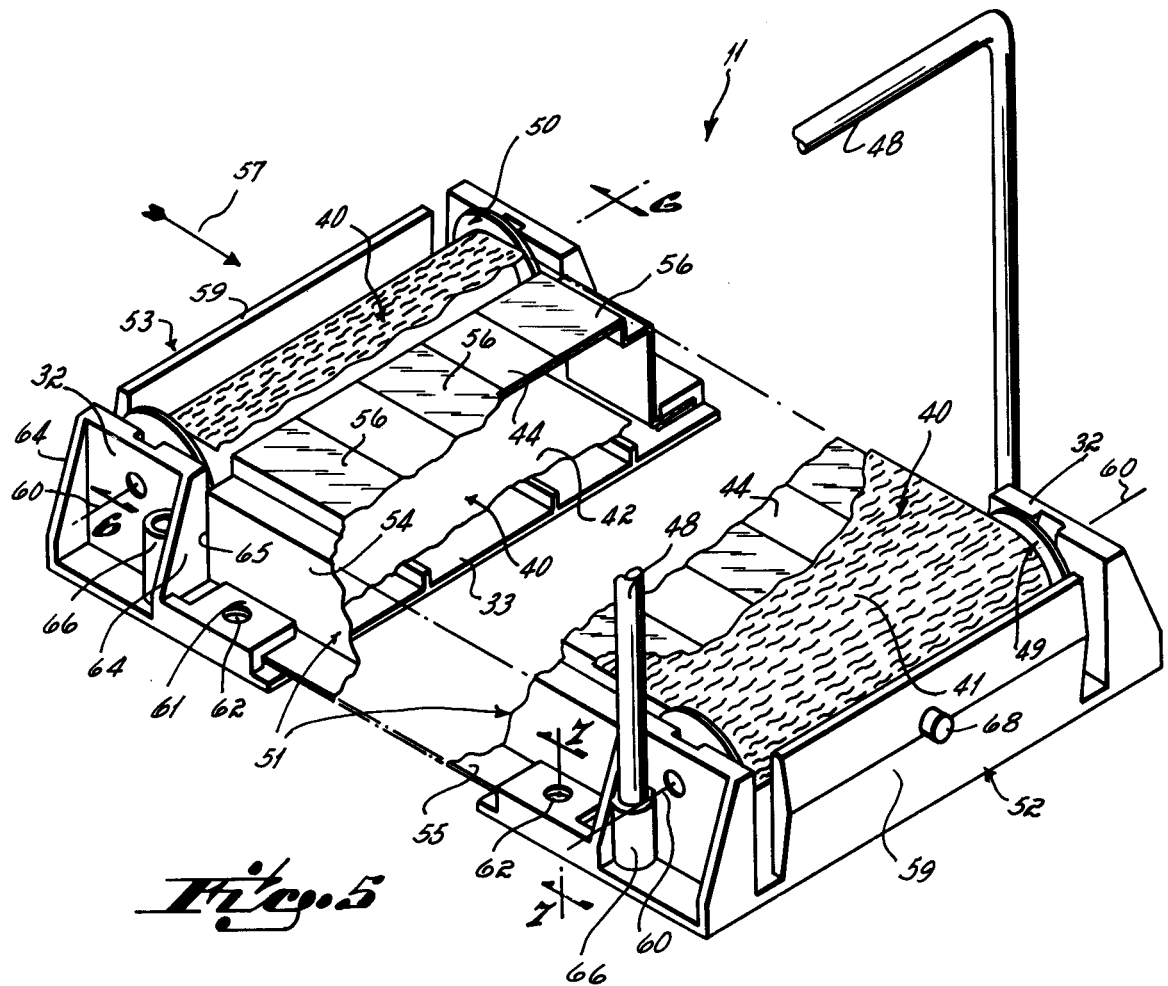
FIG. 5 is a perspective view, partially broken away, illustrating an improved conveyor belt assembly in accord with the principles of this invention.

A display rack 10 having a series of improved conveyor belt assemblies 11 in accord with the principles of this invention, all those assemblies being carried on a single shelf 12, is illustrated in FIG. 1. As shown in that figure, the shelf 12 is cantilevered out from a two corner post 13 display rack structure. The two corner posts 13 are connected with a floor section 14 structured to support the display rack 10, and a hood section 15, all as known to the art. The cantilevered shelf 12 is comprised of opposed side walls 16, 17, a front wall 18, a rear wall 19, and a floor frame comprised of a plurality of parallel floor rails 20 extending between the side walls, all of which are welded together into a one piece configuration as shown in FIG. 2. The rear corners 21, 22 of the cantilevered shelf is provided with hooked fingers 23 adapted to be received in connected relation with slots 24 disposed on the cornerposts 13 from the top to bottom thereof, thereby permitting the shelf to be located at the desired height level relative to ground in known fashion as desired by the user.

The floor of the shelf 12, as designed by the floor rails 20, is angled relative to horizontal 25 with the shelf's floor plane 26 being angled upwardly from the front edge 27 to the rear edge 28 thereof. The front edge 27 of the shelf 12 is provided with an upstanding front lip 29, and the rear edge 28 of the shelf is provided with an upstanding rear lip 30, both of which extend upwardly above the support floor plane 26. The front 29 and rear 30 lips are provided with spaced locator notches 31 therein for cooperating with the conveyor belt assemblies 11 in locating those assemblies in desired spatial orientation on the shelf's floor plane 26 as explained in greater detail below.

A one piece wire overlay frame 35 is assembled with the shelf 12, as shown in FIG. 2, for purpose of subdividing the shelf's floor plane 26 into a plurality of nine columns 36 as shown in FIG. 1. This overlay frame 35 is comprised of ten column side rails 37 disposed normal or perpendicular to the front edge 27 of the shelf. The columns side rails 37 are held in spaced parallel relation one with another by front 38 and rear 39 cross bars that connect smae into one piece configuration. The overlay frame 35 is sized so that the front 38 and lower rear 39a cross bars just fit interiorly of the shelf periphery as shown in FIGS. 1 and 3, thereby locating the frame 35 in fixed position with the shelf. The upper rear 39b cross bar is elevated above the rear 30 lip on the shelf so as to establish a fixed rear stop on the shelf at the rear 38 edge thereof.

Each of the column 36 areas of sloping shelf 12 is provided with an improved conveyor belt assembly 11 in accord with the principles of this invention, and as more particularly illustrated in FIGS. 4–7. The improved conveyor belt assembly 11 illustrated includes an endless conveyor belt 40 having an outside surface 41 with a high coefficient of friction, an an inside surface 42 with a low coefficient of friction, those friction coefficients being relative to one another. The friction coefficient on the outside surface 41 is sufficient to prevent substantial movement of the vertically disposed containers 43 on the belt 40 relative one to another as the belt moves or as it stops, and the friction coefficient of the belt's inside surface 42 relative to the belt's support floor 44 is such that gravity on the remaining containers on the belt causes the belt to slide forwardly over the stationary support floor 44 when the lead container 45 of a container column 46 on the assembly is removed from the front edge 27 of the shelf until the next forward container 47 abuts bumper 48 at the shelf's front edge. The friction coefficients for the belt's inside surface 42 and outside surface 41 may be the same as long as the friction coefficient of the support floor 44 is low relative to the friction coefficient of the belt's inside surface 42 so as to permit the gravity induced motion just mentioned.

Figure 6:
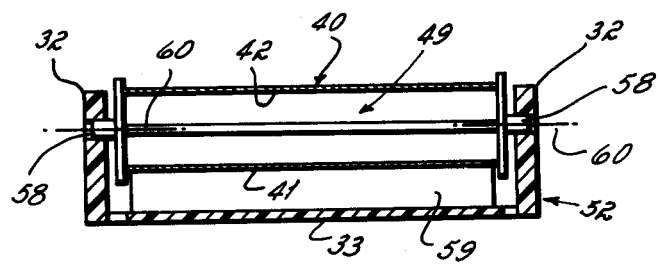
FIG. 6 is a cross-sectional view taken along line 6—6 of FIG. 5.

The endless belt 40 is tracked around front 49 and rear 50 idler spools at each end of the belt assembly 11, the idler spools being molded from a suitable thermoplastic in a one piece configuration as shown in FIGS. 4 and 6. The belt assembly 11 also includes a floor frame 51 and an end cap 52, 53 connected at each end thereof, the end caps mounting the idler spools 49, 50. The floor frame 51 includes support floor 44, side walls 54, and flanges 55. However, and importantly, the support floor 44 is coated with three separate spaced strips 56 (which extend from one end to the other of the support floor, and which extend parallel to the travel path 57 of containers on the belt assembly 11) of a low friction coefficient material. The low friction coefficient material may be, for example, a polytetrafluorethylene such as that sold under the trademark TEFLON, or a polyethylene with silicon impregnation. In this structural belt assembly 11, therefore, and whether the inside surface 42 of the endless belt 40 is of the same or of a lesser friction coefficient than the outside surface 41 of the endless belt, a high-low friction coefficient relationship is set up between the belt support floor 44 and the inside surface 42 of the endless belt because of the low friction coefficient strips 56 on the floor itself. Although three such strips 56 are shown, it will be understood that more or less strips may be used as desired by the fabricator to achieve the desired function of the rack 10.

Figure 7:
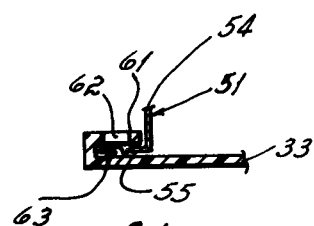
FIG. 7 is a cross-sectional view taken along line 7—7 of FIG. 5.

Each end of the belt support floor 44 receives a one-piece end cap 52, 53 formed of a thermoplastic. Each end cap includes spaced bearing blocks 32 adapted to receive axles 58 of the front 49 and rear 50 idler rollers, respectively. These spaced bearing blocks 32 are connected by web 33 in fixed relation. A spacer wall 59 is formed integral with web 33 and is spaced from bearing axis 60 defined by the bearing blocks 32. This spacer wall 59 insures that the idler rollers 49, 50 at the front and rear edges of the display rack 10 are suitably spaced when assembled therewith, thereby insuring free idler spool rotation for that front idler spool 49 during use. Each one piece end cap 52, 53 also includes, on opposite sides thereof, a flexible latch finger 61 that defines a bore 62. The latch finger's bore 62 cooperates with dimple 63 on connector flanges 55 of the assembly's floor frame 51, as shown in FIG. 7, for connecting the end cap to the floor frame. Each end cap 52, 53 also includes gussets 64 to rigidify the bearing blocks 32 relative to web 33, the gussets also cooperating with end edge 65 of the floor frame 51 and the latch fingers 61 to locate the end cap in fixed positin as assembled.

Each end cap 52, 53 also includes upstanding tubular mounts 66 on opposed sides thereof (only one mount being shown in detail). As shown in FIGS. 1, 2, 3 and 5, only the front end cap 52 receives a spring wire shock absorber or bumper 48 of inverted U-shaped configuration in those tubular mounts. The spring wire shock absorber 48 is, therefore, directly and independently mounted to the belt assembly 11. Further, and as shown in FIG. 1, the bumper 48 is structured so that it does not impede visual review of the label on the lead container 45 in column 46.

Each conveyor belt assembly 11 is connected with the shelf 12 in a columnar area 36 through use of detents 68 molded integral on the spacer walls 59 thereof, those detents 68 cooperate with notches 31 in the front 29 and rear 30 lips of the shelf. In this regard, the end caps 52, 53 and floor frame 51 are sized so that front and rear detents 68 are spaced one from the other a distance equal to the width W between the shelf's front 29 and rear 30 lips. This interconnect structure 68, 31 not only retains the conveyor belt assembly 11 in fixed combination with the shelf 12, but also locates that conveyor belt assembly in parallel alignment relative to the columnar side rails 37 of the overlay frame 35 due to the spatial relation therebetween.

Use of the improved conveyor belt assembly 11 is illustrated in FIG. 1. When fully loaded with, e.g., bottles 43, each assembly 11 is adapted to hold a column 46 of bottles from the front edge 27 to the rear edge 28 thereof, the column of bottles being sloped upwardly from the front edge to the rear edge of the shelf. The bottles 43 are initially positioned on the high friction coefficient or outside surface 41 of the conveyor belt 40, and the bottles are supported from underneath the belt 40 by the support floor 44 with low friction coefficient strips 56. The bottles 43 are positioned on the belt 40 in generally vertical fashion (although the bottles tip forward slightly as shown in the figures because of the slope of the support plane 26), and may be spaced slightly one from another if desired. The rear bottles of the column 46 do not slide toward the front bottles in the column after being loaded on the shelf 12 because the high friction coefficient surface 41 prevents sliding of the bottles on the belt 40. The column 46 of bottles 43 as initially loaded, and as shown in FIG. 1, is retained in the attitude shown in that figure by virtue of the lead bottle 45 abutting spring wire bumper 48.

After the lead bottle 45 has been removed by a prospective customer, gravity on the remaining bottles 43 in the column 46 overcomes the frictional contact between the belt's inside surface 42 and the support floor 44 so that the conveyor belt moves forward in the direction illustrated by arrow 57, thereby carrying with it the remaining bottles thereon. In other words, and after the old lead bottle 45 has been removed from the column 46, gravity induces the conveyor belt 40 to slide forwardly in the direction of arrow 57 on the support floor 44 until new lead bottle 47 abuts shock absorber or bumper 49. This forward motion is induced by gravity because of the low frictional resistance between the inside surface 42 of the belt 40 and the floor 44. On the other hand, the bottles supported on the top surface 41 of the belt 40 remain in the predetermined relation as initially loaded onto that belt during downward sliding movement 57 of the belt because of the high friction contact between the bottles' bases and the top surface of the belt.

As the belt 40 moves forwardly in response to gravity, the second bottle 47 in the original column 47 becomes the new lead bottle and abuts the shock absorber 48, the bumper 48 may flex slightly to provide an easy bumpered or cushioned stop for the new lead bottle. When the new lead bottle 47 is stopped by the bumper 48, and because of the frictional relation between the new lead bottle's base and the top or outside surface of the conveyor belt 40, the belt itself stops. Further, and because of the frictional contact between successive bottles on the belt behind the new lead bottle 47, those successive bottles are also immediately stopped. Therefore, no significant impacting of the remaining bottles along the column 46 occurs as those bottles move forwardly in response to the withdrawal of the old lad bottle 45, or when forward motion of those bottles is stopped.

Having described in detail the preferred embodiments of my invention, what I desire to claim and protect by Letters Patent is:

1. An improved conveyor belt assembly for use with a display rack, said assembly functioning to gravity feed a column of containers one after another to the front edge of a shelf as that column's lead containers are successively removed by a customer, said assembly comprising a conveyor belt positionable on said rack at an angle relative to the horizontal, said conveyor belt sloping generally upward from the front edge of said shelf, each container in said column being positioned in generally vertical fashion on said belt during use of said rack, a support floor disposed beneath said conveyor belt, said conveyor belt and said support floor cooperating to support said containers in said column on the upper surface of said conveyor belt, the upper surface of said conveyor belt having a frictional relation with said containers that inhibits movement on said belt of said containers relative one to the other, said support floor and the undersurface of said conveyor belt having a friction relation with one another that allows movement of said belt over said support floor when said belt is at least partially loaded with containers and when not restrained against movement, said friction relationships being such that said belt can slide over said support floor while said containers remain generally stationary relative one to the other on said conveyor belt after removal of the column's lead container during use of said rack, a molded plastic end cap mounted on each end of said support floor, each end cap including an idler spool connected in freely rotating relation therewith, said conveyor belt being an endless conveyor belt carried on said idler spools, and said support floor being disposed beneath the upper run of said conveyor belt, latch means partially carried by said end cap and partially carried by said floor, said latch means being flexible to permit easy snap-on assembly of said end cap with said floor, and a bumper mounted in one of said end caps and positionable adjacent the front edge of said assembly, said conveyor belt conveying all of said containers in said column forward together toward said bumper in response to gravity on the remaining containers in said column after removal of the lead container from said column, said conveyor belt and said container column being stopped by contact of the container in back of the lead container with said bumper, thereby positioning a new lead container adjacent the front edge of said shelf.

2. An improved conveyor belt assembly as set forth in claim 1, said bumper being comprised of
an inverted generally U-shaped spring wire.

3. An improved conveyor belt assembly as set forth in claim 1, at least one end cap further comprising
a spacer wall disposed generally parallel to the rotation axis of said spool, said spacer wall being spaced from said spool a distance sufficient to permit free rotation of said spool when the end of said assembly on which said end cap is mounted is in abutting contact with said shelf.

4. An improved conveyor belt assembly as set forth in claim 1, said support floor being at least partially coated with a low friction coefficient material.

5. An improved conveyor belt assembly as set forth in claim 4, said low friction coefficient material being polytetrafluoroethylene.

6. An improved conveyor belt assembly for use with a display rack, said assembly functioning to gravity feed a column of containers one after another to the front edge of a shelf as that column's lead containers are successively removed by a customer, said assembly comprising, a conveyor belt positionable on said rack at an angle relative to the horizontal, said conveyor belt sloping generally upward from the front edge of said shelf, each container in said column being positioned in generally vertical fashion on said belt during use of said rack, a support floor disposed beneath said conveyor belt, said conveyor belt and said support floor cooperating to support said containers in said column on the upper surface of said conveyor belt, the upper surface of said conveyor belt having a friction relation with said containers that inhibits movement on said belt of said containers relative one to the other, said support floor and the undersurface of said conveyor belt having a friction relation with one another that allows movement of said belt over said support floor when said belt is at least partially loaded with containers and when not restrained against movement, said friction relationships being such that said belt can slide over said support floor while said containers remain generally stationary relative one to the other on said conveyor belt after removal of the column's lead container during use of said rack, molded plastic end caps mounted on each end of said support floor, each end cap including an idler spool connected in freely rotating relation therewith, said conveyor belt being carried on said idler spools, alignment structure mounted on at least one of said end caps, said alignment structure being adapted to cooperate with said rack for aligning said assembly in desired operational position on said shelf relative to the front edge of said shelf, said alignment structure comprising one of a detent and a notch adapted to interfit with the other of said detent and said notch, the other of said detent and said notch being formed in said shelf, and a bumper mounted upon one of said end caps and positionable adjacent the front edge of said assembly, said conveyor belt conveying all of said containers in said column forward together toward said bumper in response to gravity on the remaining containers in said column after removal of the lead container from said column, said conveyor belt and said container column being stopped by contact of the container in back of the lead container with said bumper, thereby positioning a new lead container adjacent the front edge of said shelf.

7. An improved conveyor belt assembly as set forth in claim 6, said assembly further comprising
latch means partially carried by said end cap and partially carried by said floor, said latch means being flexible to permit easy snap-on assembly of said end cap with said floor.

8. An improved conveyor belt assembly as set forth in claim 6, at least one end cap further comprising
a spacer wall disposed generally parallel to the rotation axis of said spool, said spacer wall being spaced from said spool a distance sufficient to permit free rotation of said spool when the end of said assembly on which said end cap is mounted is in abutting contact with an upstanding lip mounted on said shelf.

9. An improved conveyor belt assembly for use with a display rack, said assembly functioning to gravity feed a column of containers one after another to the front edge of a shelf as that column's lead containers are successively removed by a customer, said shelf having a front upstanding lip along the front edge thereof, said assembly comprising a conveyor belt positionable on said rack at an angle relative to the horizontal, said conveyor belt sloping generally upward from the front edge of said shelf, each container in said column being positioned in generally vertical fashion on said belt during use of said rack, a support floor disposed beneath said conveyor belt, said conveyor belt and said support floor cooperating to support said containers in said column on the upper surface of said conveyor belt, the upper surface of said conveyor belt having a friction relation with said containers that inhibits movement on said belt of said containers relative one to the other, said support floor and the undersurface of said conveyor belt having a friction relation with one another that allows movement of said belt over said support floor when said belt is at least partially loaded with containers and when not restrained against movement, said friction relationships being such that said belt can slide over said support floor while said containers remain generally stationary relative one to the other on said conveyor belt after removal of the column's lead container during use of said rack, front and rear plastic molded end caps mounted on the ends of said support floor, each end cap including an idler spool connected in freely rotating relation therewith, said conveyor belt being carried on said idler spools, a spacer wall mounted on said front end cap and disposed parallel to the rotation axis of said spool, said spacer wall being spaced from said spool a distance sufficient to permit free rotation of said spool when the front end of said assembly is in abutting contact with the front upstanding lip of said shelf, and a bumper mounted on said front end cap and positionable adjacent the front edge of said assembly, said conveyor belt conveying all of said containers in said column forward together toward said bumper in response to gravity on the remaining containers in said column after removal of the lead container from said column, said conveyor belt and said container column being stopped by contact of the container in back of the lead container with said bumper, thereby positioning a new lead container adjacent the front edge of said shelf.

10. An improved conveyor belt assembly for use with a display rack, said assembly functioning to gravity feed a column of containers one after another to the front edge of a shelf as that column's lead containers are successively removed by a customer, said shelf having front and rear upstanding lips along the front and rear edges thereof, said assembly comprising a conveyor belt positionable on said rack at an angle relative to the horizontal, said conveyor belt sloping generally upward from the front edge of said shelf, each container in said column being positioned in generally vertical fashion on said belt during use of said rack, a support floor disposed beneath said conveyor belt, said conveyor belt and said support floor cooperating to support said containers in said column on the upper surface of said conveyor belt, the upper surface of said conveyor belt having a friction relation with said containers that inhibits movement on said belt of said containers relative one to the other, said support floor and the undersurface of said conveyor belt having a friction relation with one another that allows movement of said belt over said support floor when said belt is at least partially loaded with containers and when not restrained against movement, said friction relationships being such that said belt can slide over said support floor while said containers remain generally stationary relative one to the other on said conveyor belt after removal of the column's lead container during use of said rack, front and rear plastic molded end caps mounted on the ends of said support floor, each end cap including an idler spool connected in freely rotating relation therewith, said conveyor belt being carried on said idler spools, a bumper mounted on said front end cap and positionable adjacent the front edge of said assembly, said conveyor belt conveying all of said containers in said column forward together toward said bumper in response to gravity on the remaining containers in said column after removal of the lead container from said column, said conveyor belt and said container column being stopped by contact of the container in back of the lead container with said bumper, thereby positioning a new lead container adjacent the front edge of said shelf, and assembly alignment structure associated with said front and rear end caps, said assembly alignment structure being adapted to cooperate with shelf alignment structure on said shelf's front and rear lips for aligning said assembly in desired operational position on said shelf relative to the front edge of said shelf.

11. An improved conveyor belt assembly as set forth in claim 10, said assembly and shelf alignment structure comprising one of a detent and a notch adapted to interfit with the other of said detent and said notch, one of said detent and said notch being connected to said end cap and the other of said detent and said notch being connected to said shelf.

* * * * *